Aug. 23, 1932.  C. S. BRAGG ET AL  1,872,658
BRAKE SYSTEM FOR AUTOMOTIVE VEHICLES
Filed Sept. 1, 1928  3 Sheets-Sheet 1
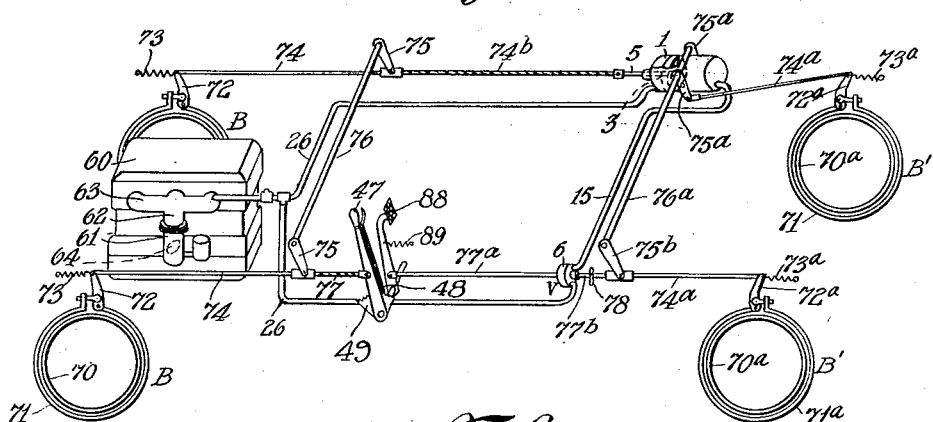
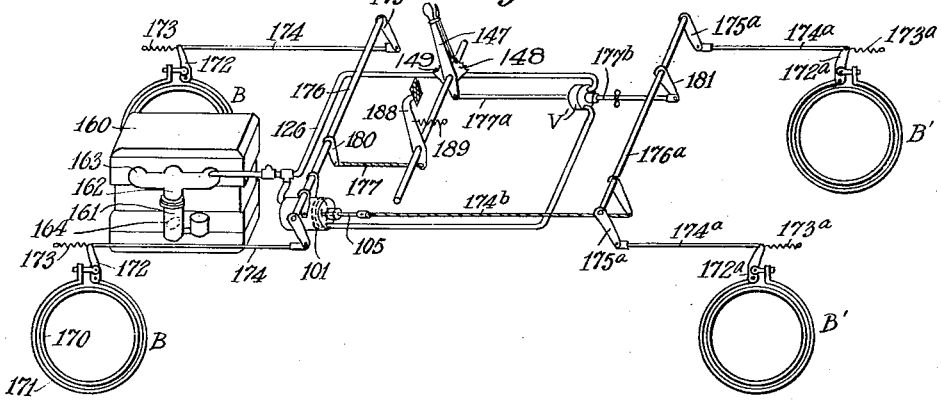
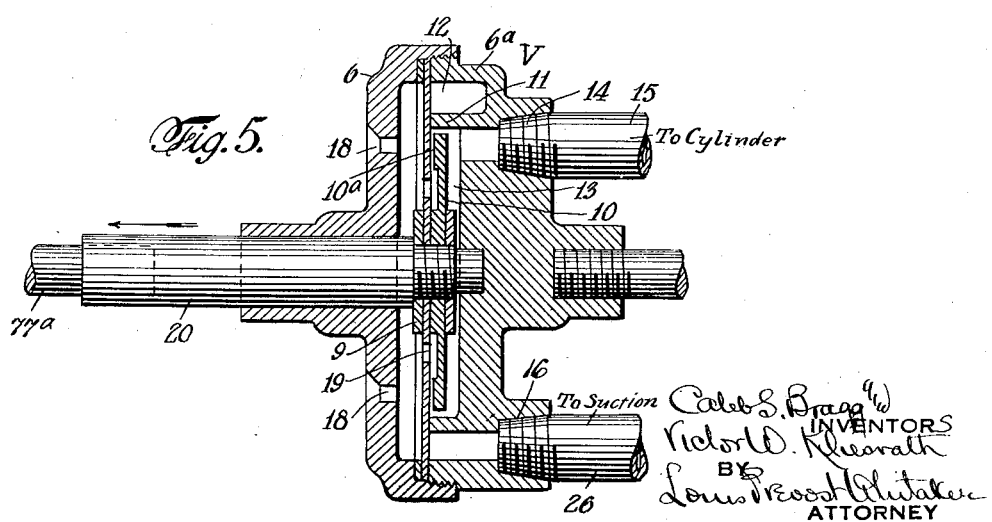

Aug. 23, 1932.　　C. S. BRAGG ET AL　　1,872,658
BRAKE SYSTEM FOR AUTOMOTIVE VEHICLES
Filed Sept. 1, 1928　　3 Sheets-Sheet 2
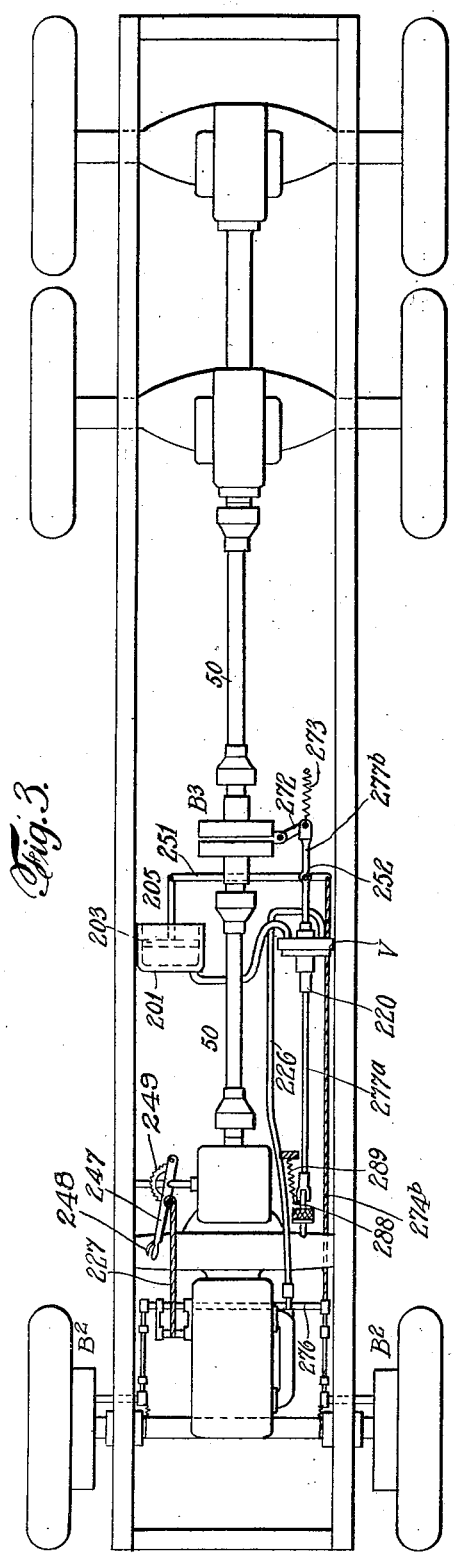
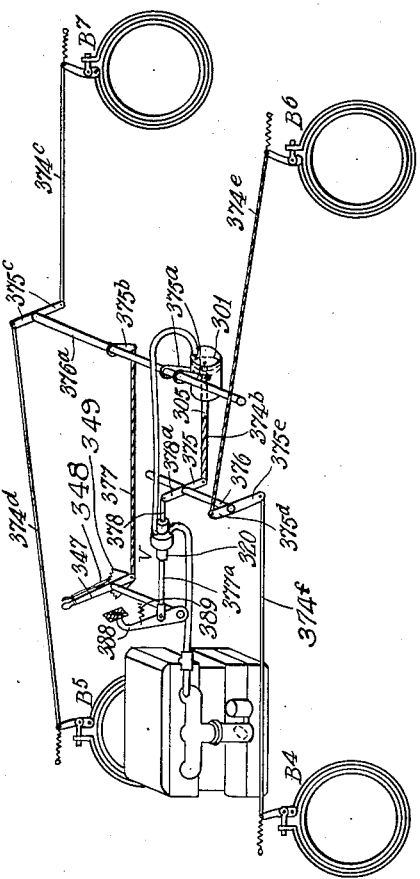

Aug. 23, 1932.   C. S. BRAGG ET AL   1,872,658
BRAKE SYSTEM FOR AUTOMOTIVE VEHICLES
Filed Sept. 1, 1928   3 Sheets-Sheet 3

INVENTORS
Caleb S. Bragg and Victor W. Kliesrath
BY
Louis Prevost Whitaker
ATTORNEY Patented Aug. 23, 1932

1,872,658

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed September 1, 1928. Serial No. 303,414.

Our invention consists in the novel features hereinafter described, reference being had to the accompanying drawings which show several forms in which we have contemplated embodying our invention, selected by us for purposes of illustration, and the said invention is fully disclosed in the following description and claims.

Our invention is an improvement in brake systems for automotive vehicles and it consists in providing in connection with brake mechanisms for the wheels located adjacent to the front and rear ends of the vehicle, of two separate manually operated parts, one of said parts being connected with certain brake mechanisms, and the other of said parts being connected to other brake mechanisms for applying the physical force of the operator to the brake mechanisms connected with each of said manually operated parts, and in further providing a power operated means operatively connected to all of the brake mechanisms for applying them simultaneously by power, under the control of suitable controlling valve mechanism operable by one, or the other of the said manually operated parts. We prefer, in carrying out our invention, to employ a power actuator operated by differential of fluid pressures obtained by using atmospheric pressure as the higher fluid pressure acting against suction or rarification as the lower fluid pressure, produced by a connection to the suction passage of an internal combustion engine employed for propelling the vehicle and connected preferably to the intake manifold between the throttle valve and the engine cylinders.

The accompanying drawings illustrate several ways in which our invention may be carried into effect. In said drawings, Fig. 1 is a diagrammatic perspective view of a brake system for an automotive vehicle embodying our invention in which a pedal lever is operatively connected with the rear wheel brake mechanisms, a hand lever is connected with the front wheel brake mechanisms, and a power actuator is connected with all of the brake mechanisms and controlled by a valve in the linkage between the pedal lever and the rear wheel brake mechanisms.

Fig. 2 is a similar view of a modified embodiment of our invention in which the controlling valve mechanism is located between the hand lever and the brake mechanisms connected therewith.

Fig. 3 is a diagrammatic plan view of another modified embodiment of our invention in which the pedal lever is connected to a brake mechanism on the jack shaft, by connections, in which the controlling valve mechanism for the actuator is located, the hand lever being connected to the front wheel brake mechanisms, and the actuator being connected with all of said brake mechanisms.

Fig. 4 is a view similar to Fig. 1 of another modified embodiment of our invention, in which each of the manually operated parts is connected with brake mechanisms for wheels on one side of the vehicle only, the actuator being connected with all the brake mechanisms and its controlling valve located in linkage between the foot pedal and the brake mechanism operated thereby.

Fig. 5 represents a sectional view of one form of controlling valve mechanism which may be employed in carrying out our invention.

Figure 6:
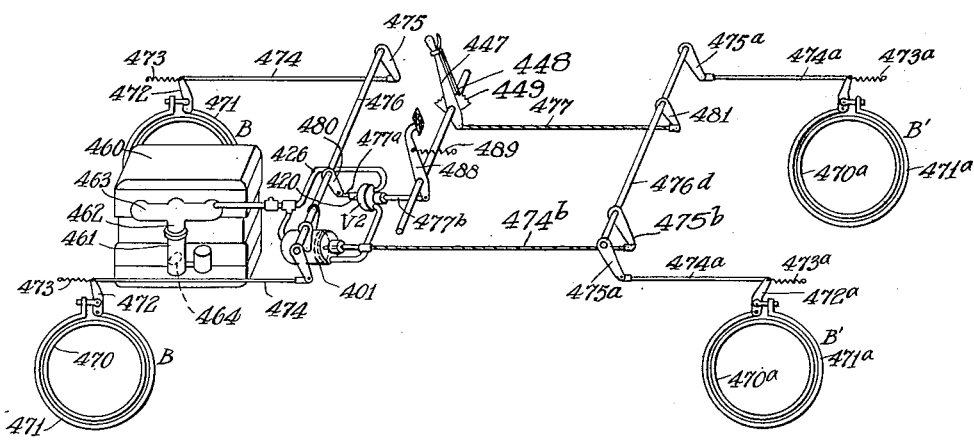
Fig. 6 is a view similar to Fig. 2, showing another embodiment of our invention.

In the embodiment of our invention shown in Fig. 1, B, B, represent the front or steering wheel brake mechanisms of the vehicle and B¹, B¹, represent the brake mechanisms for the rear or driving wheels. The brake mechanisms may be of any desired type, but for purposes of illustration we have shown them as each comprising a brake drum, 70, brake band, 71, and brake lever, 72, provided with the usual retracting spring, 73.

The levers, 72, of the front wheel brakes are shown connected by links, 74, to arms, 75, on a transverse rock shaft, 76, in the usual manner, and the rock shaft, 76 is operatively connected with a hand operated lever, 47, which may be provided with the usual locking pawl, 48, and segment, 49, and is in this instance connected to one of the arms, 75, by a flexible cable, 77, to permit the brake mechanisms to be applied by the actuator without operating the hand lever.

The actuator shown in this instance comprises a cylinder, 1, and piston, 3, both of which are movable with respect to the vehicle, the cylinder, 1, being provided with trunnions engaging supporting arms 75ª, 75ª, secured to a transverse rock shaft, 76ª, for operating the rear wheel brake mechanisms. In this instance one of the arms, 75ª, is connected by a link, 74ª, with the lever, 72ª, of one of the rear wheel brake mechanisms, the lever, 72ª, of the other rear wheel brake mechaism being connected by a link, 74ª, with an arm, 75ᵇ, on the rock shaft 76ª.

The actuator piston, 3, has its piston rod, 5, connected by a link, 74ᵇ, preferably in the form of a flexible cable, with the rock shaft, 76, which in this instance is connected to one of the arms, 75. When the actuator is operated by power, the cylinder will move forwardly and the piston rearwardly, so as to apply all of the brakes by power, as will be readily understood.

88 represents a pedal lever which is connected by linkage in which the controlling valve for the actuator is located, with the rock shaft, 76ª, for operating the rear wheel brake mechanisms. It will be understood that the levers, 47 and 88, are so pivotally mounted as to be movable independently of each other. The valve mechanism herein illustrated is shown in section in Fig. 5, to facilitate the understanding of our invention, but the specific construction forms no part of our present invention, as it is covered by our former application, Serial No. 231,724, filed November 7, 1927. The valve mechanism is not claimed herein and will be briefly described to enable its operation to be understood. The controlling valve mechanism indicated as a whole at V, comprises a hollow casing, preferably formed of two parts, 6 and 6ª, screwed together upon the edges of a diaphragm valve, 8, dividing the casing into two compartments. The casing member, 6ª, is provided with an annular diaphragm engaging seat, 11, which divides the space within said casing member into a central chamber, 13, and an annular suction chamber, 12, when the diaphragm is seated firmly upon the seat, 11. The casing member, 6ª, is provided with an aperture, 14, communicating with chamber, 13, connected by a pipe, 15, to the portion of the cylinder of the actuator between the piston and a closed end of the cylinder, the opposite face of the piston being at all times exposed to atmospheric pressure. Casing member, 6ª, is also provided with an aperture, 16, communicating with suction chamber, 12, and connected by a suction pipe, 26, with the suction passage of the internal combustion engine between the throttle valve and the engine cylinders. We have shown the engine at 60, provided with the usual carburetor, 61, connected by the suction passage, including the vertical portion, 62, and the intake manifold, 63, with the engine cylinders, the throttle valve being indicated in dotted lines at 64. The suction pipe, 26, is connected in this instance to the manifold, 63.

Within the chamber, 13, of the valve casing is located a disc valve, 10, having an annular diaphragm engaging seat, 10ª, and forming when seated a chamber within said seat, 10ª, and between the diaphragm and disc valve. The casing member, 6, is provided with one or more apertures, 18, communicating with the atmosphere, and the diaphragm, 8, is provided with one or more apertures, 19, by which atmospheric air may pass to the space between the diaphragm and disc valve, at all times. The diaphragm and disc valve are connected rigidly and sealingly to a valve actuating part, 20, extending through an aperture in the casing member, 6, and having a limited amount of movement with respect to the casing determined by a collar or washer, 9, on the part, 20, which engages the inner face of casing member, 6, when the part, 20, has been moved a predetermined distance in the direction of the arrow, Fig. 5, that is to say far enough to bring the seat, 10ª, of the disc valve into engagement with the diaphragm, 8, and disengage the diaphragm from its seat, 11.

In installing the valve mechanism in the linkage described, the valve actuating part, 20, is connected to one link rod, in this instance to the link rod, 77ª, the forward end of which is connected to the foot lever, 88, and the casing is connected to the other link rod, in this instance the rod, 77ᵇ, which is connected at its rear end to the arm, 75ᵇ. We prefer to locate a suitable adjusting device of any desired type, indicated at 78, between the valve mechanism and the arm, 75ᵇ, on the rock shaft, 76ª, so that adjustment may be made from time to time as the friction parts of the brake mechanism to which the foot lever is connected wear, to prevent the foot pedal from striking the floor board or other obstruction, when the physical force of the operator is applied to the pedal, 88. The foot pedal is preferably provided with a retracting spring, indicated at 89, to insure the return of the valve mechanism to the released position, indicated in Fig. 5, with the valve actuating part, 20, in its rearmost position with respect to the valve casing and the diaphragm, 8, firmly seated upon the interior casing seat, 11.

Assuming that the engine is running and the throttle is closed or partly closed, a rarification will be produced in the suction passage of the engine, approximately that indicated by .20 inches of mercury or 10 pounds per square inch at sea level, and the air will be exhausted from the suction pipe, 26, and the suction chamber, 12. As the opposite face of the diaphragm valve, 8, is at all times subjected to atmospheric pressure, the differential of fluid pressures on the diaphragm valve tends to hold it in its seated position in addition to the retracting spring, 89. In this position of the valve mechanism, the disc valve, 10, is out of contact with the diaphragm, 8, and the interior of the cylinder, between its closed head and the piston, is in communication with the atmosphere. The piston, as well as the closed cylinder head are then exposed to atmospheric pressure on both faces, and both may be said to be, therefore, submerged in atmosphere, in the released position. To effect an application of all the brake mechanisms by power, the operator will move the manually operated device connected with the valve mechanism, in this instance the pedal lever, 88, thereby shifting the valve actuating part, 20, in the direction of the arrow, Fig. 5, with respect to the valve casing. This brings the seat, 10ª, of the disc valve into contact with the diaphragm, shutting off the communication between the cylinder and the atmosphere, and thereafter moves the diaphragm valve 8, away from the seat, 11, thus connecting the pipe, 15, leading to the cylinder of the actuator with the suction chamber, 12, and evacuating the cylinder. The piston, 3, of the actuator is thereby caused to move rearwardly and the cylinder is caused to move simultaneously in a forward direction, thereby applying all the brake mechanisms with the predetermined braking force regulated by the maximum power of the actuator and the leverages in the connections between its members and the brake mechanisms. This form of actuator is particularly desirable, as it acts as an equalizer in distributing the power of the actuator to the cross-shafts, 76 and 76ª, and the brake mechanisms connected therewith. It will be understood that if the movement of the foot lever is stopped before the actuator has exerted its maximum power on the brake mechanisms, the continued movement of the cylinder will shift the valve casing with respect to the valve actuating part, 20, so as to allow the diaphragm valve, 8, to seat, without unseating the disc valve, 10, thus holding the brakes as applied. When the brakes have been applied to the full capacity of the actuator, the operator, by further depressing his foot, can add his physical force to the brake mechanisms with which the pedal lever is connected, in this instance the rear wheel brake mechanisms, as the stop, 9, will be brought into contact with the inner face of the valve casing member 6, after which the valve mechanism becomes part of the linkage connecting the foot lever directly with the brake mechanisms for the rear wheels. It will also be seen that the operator can add his physical force to the front wheel brake mechanisms by operating the hand lever, 47, and taking up any slack that may have been caused in the flexible cable, 77.

When it is desired to release the brake mechanisms after they have been applied by the power actuator, it is only necessary for the operator to remove his foot from the pedal, when the valve actuating part, 20, will be shifted rearwardly with respect to the valve casing by the spring, 89, and also by the differential of fluid pressures on the diaphragm, 8, returning the parts to their released position shown in Fig. 5, and reconnecting the cylinder between its closed end and its piston with the atmosphere, thus admitting air to this portion of the cylinder, and permitting the retracting spring, 73, to restore the brake mechanisms and the piston and cylinder to their released position.

It will also be seen that the operator may apply the front wheel brake mechanisms at any time by operating the hand lever, 47, regardless of whether the engine is running or not and entirely independently of the power actuator. It will also be seen that if the engine is not running and the power actuator is inoperative for that or any other reason, the operator can actuate the rear brake mechanisms by means of the foot lever, 88, by simply taking up the lost motion between the valve actuating part, 20, and the casing of the controlling valve mechanism. In such case the valve mechanism has been brought into a position to vent the cylinder, so as to permit free relative movement of the piston and cylinder before the lost motion is taken up and the physical force of the operator is applied to the brakes, so that the rear wheel brake will be operated without operating the front wheel brakes and where a flexible cable, 74ᵇ, or other usual construction providing lost motion is employed between the piston and front wheel brakes, the rear wheel brakes can be applied by the physical force of the operator, without causing a movement of the piston with respect to the cylinder.

We have, therefore, a brake system in which there are two manually operated parts, each capable of applying physical force to brakes for certain wheels of the vehicle only, without affecting the brakes controlled by the other of said manually operated parts, in association with a power actuator connected with and operative to apply all brake mechanisms for all the wheels under the control of valve mechanisms operable by one of the manually operated parts, and installed in the connections between said manually operated parts and the brake mechanisms operated thereby.

It is to be understood that the foot lever may be connected either with the front wheel brake mechanisms as shown in Figs. 2 and 6 for example or with the rear wheel brake mechanisms as shown for example in Figs. 1 and 3, and that the hand lever may be connected either with the front wheel brake mechanisms as shown for example in Figs. 1 and 3 or with the rear wheel brake mechanisms as shown for example in Figs. 2 and 6, and the valve mechanism for the power actuator may be interposed in the connections either between the foot lever and the brake mechanisms connected therewith as in Figs. 1, 3, 4 and 6, or between the hand lever and brake mechanisms connected therewith, as in Fig. 2, as may be found most desirable. In installations intended for trucks or buses, in which the greater portion of the load is always upon the rear wheels, we prefer the arrangement illustrated in Fig. 1, but in the case of pleasure cars in which the deceleration or slowing down of the vehicle by the application of the brakes tends to transfer a portion of the weight of the vehicle temporarily upon the front wheels and increases the coefficient of friction between them and the roadway, it may be desirable to connect the pedal lever with the front wheel brake mechanisms.

In Fig. 2 for example, in which the parts corresponding with those previously described with reference to Fig. 1 are given the same numerals with the addition of 100, we have shown the power actuator cylinder, 101, operatively connected with the rock shaft, 176, for the front wheel brakes, while the piston rod, 105, is connected preferably by a cable, 174$^a$, with the rock shaft, 176$^a$, for the rear wheel brakes, and the pedal lever, 188, is in this instance connected by a cable 177, with an arm, 180, on the rock shaft 176. It will be understood that in this case also the pedal lever and foot lever are movable independently of each other. In this figure the hand lever, 147, is connected with the valve actuating part, 120, by a link rod, 177$^a$, and the valve casing is connected by a rod 177$^b$, with an arm, 181, on a rock shaft, 176$^a$. With this arrangement the front wheel brakes may be applied by the pedal lever independently of the actuator. The rear wheel brakes may be applied by the hand lever when the engine is not running or the power actuator is inoperative for any reason, all of the brakes may be applied by power when the engine is running and the power actuator is operative under the control of the valve mechanism, V, which is operated in this case by the hand lever, and the operator may add his physical force to the front wheel brake mechanisms through the pedal, 188, and to the rear wheel brakes through the hand lever, 147, by taking up the lost motion between the valve actuating part and the valve casing. It will be understood that while we have referred to certain of the linkages as flexible cables which form a convenient means for maintaining a connection between the parts and at the same time permitting the independent movements of the brake mechanisms by other actuating means, other forms of loose connections may be employed for the same purpose, if desired.

In Fig. 3 we have shown another brake system for automotive vehicles embodying our invention, the parts corresponding with those previously described with reference to Fig. 1 being given the same numerals with the addition of 200 to avoid repetition. In this diagrammatic figure, the vehicle is shown with more than four wheels and with a propeller shaft or jack shaft, indicated at 50, for transmitting the power of the engine to the driving wheels, of which two pairs are shown, and a brake mechanism for the driving wheels is in this instance located on the jack shaft, as indicated at B$^3$, the brake applying lever therefor being indicated at 272. The front wheel brake mechanisms are indicated at B$^2$, B$^2$, and are connected with a transverse rock shaft, 276. In this instance the foot lever, indicated at 288, is connected by a link rod, 277$^a$, with the valve actuating part, 220, of the valve mechanism, V, the casing of which is connected by a link rod, 277$^b$, with the actuating lever, 272, of the brake mechanism, B$^3$. The hand lever indicated at 247 which is movable independently of the pedal lever, is shown in this instance connected by a cable, 277, with the rock shaft, 276. The power actuator cylinder, 201, is in this instance mounted stationarily with respect to the vehicle, and the piston, 203, has its piston rod, 205, connected with a lever, 251, pivotally connected at 252, with the link rod, 277$^b$, and having its other end connected by a cable, 274$^b$, with the rock shaft, 276. In this embodiment of our invention the front wheel brake mechanisms may be applied at any time independently of the power actuator by the hand lever, 247. The foot lever, 288, may be operated to apply the brake mechanism, B$^3$, for the rear wheels when the engine is not running or the power actuator otherwise rendered inoperative. The brake mechanisms for all the wheels may be applied by power of the actuator, when the engine is running, by operating the foot lever, and after the brake mechanisms have been applied to the full extent of the power of the actuator, the operator may, by further pressure applied to the foot lever, add his physical force to the brake mechanism, D$^3$, on the jack shaft for the rear wheels, and may also add his physical force through the hand lever, 247, to the brake mechanisms for the front wheels.

In Fig. 4 we have illustrated still another embodiment of our invention in which the parts corresponding with those in Fig. 1 are given the same reference characters with the addition of 300. In this instance the brake mechanisms for the front wheels are indicated at B$^4$, B$^5$, and the brake mechanisms for the rear wheels are indicated at B$^6$, B$^7$. In this embodiment each of the manually operated devices is connected with the brake mechanism for one front wheel and one rear wheel on the same side of the vehicle, while the power actuator is connected operatively with all of the brake mechanisms. Thus the hand lever, indicated at 347 which is movable independently of the foot lever, is connected by a cable, 377, with an arm, 375$^b$, on a transverse rock shaft, 376$^a$, provided with oppositely extending arms, 375$^c$, connected by links, 374$^c$ and 374$^d$, with the rear wheel brake mechanism, B$^7$, and the front wheel brake mechanism, B$^5$, respectively. The foot lever, 388, is connected in this instance by a link, 377$^a$, with the valve actuating part, 320, of the valve mechanism, V, and the valve casing is connected by a link, 378, with an arm, 378$^a$, on a rock shaft, 376, which is provided with oppositely disposed arms, 375$^d$, and 375$^e$, which are connected by links, 374$^e$ and 374$^f$, respectively with the rear wheel brake mechanism, B$^6$, and the front wheel brake mechanism, B$^4$. The power actuator cylinder, 301, is in this instance movable with respect to the vehicle, and is provided with trunions engaging arms, 375$^a$, on the rock shaft, 376$^a$, while the piston rod, 305, is connected by a cable or other flexible connection, 374$^b$, with an arm, 375, on the rock shaft, 376. In this embodiment of our invention the hand lever may be operated to apply the front wheel brake mechanism, B$^5$, and the rear wheel brake mechanism, B$^7$, simultaneously and independently of the power actuator. The foot lever, 388, may be operated when the engine is not running or when the power actuator is not operating to apply the front wheel brake mechanism, B$^4$, and the rear wheel brake mechanism, B$^6$, and by simultaneously operating both of the manually operated devices all of the brake mechanisms may be applied by the physical force of the operator. By depressing the foot lever when the engine is running and the throttle closed or partly closed, the power actuator may be operated under the control of the valve mechanism, V, in the manner previously described to apply all of the brake mechanisms by power, the movement of the piston in a rearward direction applying the brake mechanisms, B$^4$ and B$^6$, and the movement of the cylinder in a forward direction applying the brake mechanisms, B$^5$ and B$^7$. When the brake mechanisms have been applied to the full capacity of the power actuator, the operator may add his physical force through the pedal lever to brake mechanisms, B$^4$ and B$^6$, in addition to the power of the actuator, and may add his physical force to the brake mechanisms, B$^5$ and B$^7$, through the hand lever, 347.

In Fig. 6 we have illustrated another embodiment of our invention, similar to that shown in Fig. 2, but providing for the insertion of the controlling valve mechanism in linkage between the pedal lever and the front wheel brake mechanism and permitting the physical force of the operator to be applied through the valve mechanism to the brake mechanism for the front wheels. In this figure the parts corresponding with those in Fig. 1 are given the same reference numerals with the addition of 400.

The construction shown in Fig. 6 is identical with that shown in Fig. 2, except that the hand lever 447 which is movable independently of the foot lever is connected with arm, 481, on rock shaft, 476$^d$, for operating the rear wheel brake mechanism, by a cable, 477, and the controlling valve, indicated at V2, for the power actuator is located in linkage between the pedal lever, 488, and the arm, 480, on the rock shaft, 476, for operating the front wheel brake mechanism. In this instance a link 477$^a$, connects the arm, 480 with the valve actuating part, 420, and the valve casing is connected by link, 477$^b$, with the pedal lever. The actuator piston is shown connected by a flexible cable, 474$^b$, with an arm, 475$^b$, on the rock shaft, 476$^d$. It is therefore unnecessary to describe the other parts of this figure in detail.

The operation will be the same as previously described with reference to Fig. 2 except that the operator may take up the lost motion between the valves and valve casing and apply the front wheel brakes by physical force alone, or add his physical force to the front wheels, after the brakes have been applied by the actuator to the extent of its power, and the physical force of the operator may be applied to the rear wheel brakes by means of the hand lever, 447, to apply them by physical force alone, or to supplement the force exerted by the power actuator.

What we claim and desire to secure by Letters Patent is:—

1. In a brake system for automotive vehicles, the combination with brake mechanisms for a plurality of wheels of the vehicle located adjacent to one end of the same, a manually operable part, connections therefrom to said brake mechanisms for operating them by physical force, independently operable brake mechanisms for a plurality of wheels of the vehicle located adjacent to the other end of the same, a second manually operable part, connections therefrom to said last mentioned brake mechanisms for applying them by physical force, power actuated means operable by the differential of fluid pressures, operatively connected with the brake mechanisms connected with each of said manually operable parts and constructed to apply said brake mechanisms simultaneously when brought into operation, and a controlling valve mechanism for said power actuated means provided with relatively movable parts interposed in the connections between one of said manually operable parts and the brake mechanisms connected therewith, for insuring the operation of said valve mechanism by said manually operable parts before the application of physical force thereby to the said connected brake mechanisms.

2. In a brake system for automotive vehicles provided with at least four wheels, the combination with brake mechanism for the front wheels, independently operable brake mechanism for the rear wheels, a manually operable part, connections therefrom to the front wheel brake mechanism for operating the same by physical force, a second manually operable part, connections therefrom to the rear wheel brake mechanism for operating the same by physical force, a power actuator operating by the differential of fluid pressures operatively connected with the brake mechanisms connected with each of said manually operable parts for applying them simultaneously by power, and controlling valve mechanism for said power actuator including parts having a limited relative movement with respect to each other, located in the connections between one of said manually operable parts and the brake mechanism connected therewith to insure the operation of the valve mechanism before the application of physical force to said connected brake mechanisms.

3. In a brake system for automotive vehicles having at least four wheels, independently operable brake mechanisms for separate pairs of wheels, a hand operated part, connections therefrom to certain of said brake mechanisms for applying physical force thereto, a foot operated part, connections therefrom to other of said brake mechanisms for applying physical force thereto, a power actuator operating by differential of fluid pressures operatively connected with the brake mechanisms connected with said hand and foot operated parts for applying them simultaneously by power, and a controlling valve mechanism comprising parts having a limited relative movement with respect to each other inserted in the connections between one of said manually operable parts and brake mechanism connected therewith to insure the operation of the valve mechanism before the application of physical force to said brake mechanisms.

4. In a brake system for automotive vehicles having at least four wheels, independently operable brake mechanisms for separated pairs of wheels, a hand operated part, connections therefrom to certain of said brake mechanisms for applying physical force thereto, a foot operated part, connections therefrom to other of said brake mechanisms for applying physical force thereto, a power actuator operating by differential of fluid pressures operatively connected with all of said brake mechanisms connected with said hand and foot operated parts for applying them simultaneously by power, and a controlling valve mechanism comprising parts having a limited relative movement with respect to each other interposed in the connections between said foot operated part and the brake mechanisms connected therewith.

5. In a brake system for automotive vehicles, the combination with a plurality of independently operable brake mechanisms, of an operator operated part connected with certain of said brake mechanisms less than the whole number for applying physical force thereto, a second operator operated part connected with the other of said brake mechanisms for applying physical force thereto, a fluid pressure operated power actuator comprising parts movable with respect to each other and the vehicle, each of said actuator parts being connected with the brake mechanism operated by one of said operator operated parts for operating all of said brake mechanisms simultaneously by power, a controlling valve for said power actuator, operatively connected with one of said operator operated parts.

6. In a brake system for automotive vehicles, the combination with a plurality of independently operable brake mechanisms, of an operator operated part, connections therefrom to certain of said brake mechanisms less than the whole number for applying physical force thereto, a second operator operated part, connections therefrom to the other of said brake mechanisms for applying physical force thereto, a fluid pressure operated power actuator comprising parts movable with respect to each other and the vehicle, each of said actuator parts being connected with the brake mechanism operated by one of said operator operated parts for operating all of said brake mechanisms simultaneously by power, a controlling valve for said power actuator comprising relatively movable parts, interposed in the connections between one of said operator operated parts and the brake mechanism operatively connected therewith.

7. In a brake system for automotive vehicles, the combination with brake mechanism for the front wheels, and independently operable brake mechanism for rear wheels of the vehicle, of a manually operated part connected with the front wheel brake mechanism, for applying the physical force of the operator thereto, a second manually operated part connected with the rear wheel brake mechanisms for applying the physical force of the operator thereto, a power actuator operative by the differential of fluid pressures, comprising parts movable with respect to each other and to the vehicle, connections from one of said actuator parts to the front wheel brake mechanism, connections from another of said actuator parts to the rear wheel brake mechanism for applying all of said brake mechanisms by power, and controlling valve mechanism for the actuator operatively connected with one of said manually operated parts.

8. In a brake system for automotive vehicles, the combination with brake mechanism for the front wheels, and independently operable brake mechanism for rear wheels of the vehicle, of a manually operated part, connections therefrom to the front wheel brake mechanism for applying the physical force of the operator thereto, a second manually operated part, connections therefrom to the rear wheel brake mechanisms for applying the physical force of the operator thereto, a power actuator operative by the differential of fluid pressures, comprising parts movable with respect to each other and to the vehicle, connections from one of said actuator parts to the front wheel brake mechanism, connections from another of said actuator parts to the rear wheel brake mechanism for applying all of said brake mechanisms by power, and controlling valve mechanism for the actuator comprising relatively movable parts located in the connections between one of said manually operated parts and the brake mechanism connected therewith.

9. In a brake system for automotive vehicles, the combination with brake mechanism for front wheels and independently operable brake mechanism for rear wheels, of a hand lever, connections therefrom to the front wheel brake mechanism, a foot lever, connections therefrom to the rear wheel brake mechanisms, a fluid pressure operated power actuator comprising a cylinder and piston, both of which are movable with respect to the vehicle, one of said actuator parts being connected with the front wheel brake mechanism and the other with the rear wheel brake mechanism for applying all of said brake mechanisms by power, controlling valve mechanism for the power actuator, comprising relatively movable parts, interposed in the connections between the foot lever and the rear wheel brake mechanism.

10. In a brake system for an automotive vehicle provided with an internal combustion engine for propelling the same, having a suction passage, the combination with a plurality of independently operable brake mechanisms for separate pairs of wheels, an operator operated part, connections therefrom to certain of said brake mechanisms less than the whole number, for applying physical force thereto, a second operator operated part, connections therefrom to other of said brake mechanisms for applying physical force thereto, a power actuator, operatively connected with the brake mechanisms connected with each of said operator operated parts for applying them all simultaneously by power, means including controlling valve mechanism for connecting the actuator with said suction passage, and with a source of higher fluid pressure, said valve mechanism comprising parts having a limited movement with respect to each other, and located in the connections between one of said operator operated parts and the brake mechanism connected therewith for insuring the operation of the valve mechanism before the application of physical force to said connected brake mechanisms.

In testimony whereof we affix our signatures.

CALEB S. BRAGG.
VICTOR W. KLIESRATH.